United States Patent
Xu et al.

(10) Patent No.: US 11,966,890 B2
(45) Date of Patent: Apr. 23, 2024

(54) BILL IDENTIFICATION METHOD, DEVICE, ELECTRONIC DEVICE AND COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Zhejiang (CN)

(*) Notice: Subject to any disclaimer, the term of this patent is extended or adjusted under 35 U.S.C. 154(b) by 442 days.

(21) Appl. No.: 16/955,784

(22) PCT Filed: Aug. 30, 2019

(86) PCT No.: PCT/CN2019/103849
§ 371 (c)(1),
(2) Date: May 3, 2021

(87) PCT Pub. No.: WO2020/173068
PCT Pub. Date: Sep. 3, 2020

(65) Prior Publication Data
US 2021/0256288 A1    Aug. 19, 2021

(30) Foreign Application Priority Data
Feb. 27, 2019    (CN) .......................... 201910147606.0

(51) Int. Cl.
*G06V 30/148*    (2022.01)
*G06Q 20/10*    (2012.01)
(Continued)

(52) U.S. Cl.
CPC ............. *G06Q 20/102* (2013.01); *G06T 7/10* (2017.01); *G06V 30/153* (2022.01);
(Continued)

(58) Field of Classification Search
CPC .... G06Q 20/102; G06Q 20/3276; G06T 7/10; G06V 30/10; G06V 30/153; G06V 30/412; G06V 30/416; G07D 7/202
See application file for complete search history.

(56) References Cited

U.S. PATENT DOCUMENTS 2,932,006 A * 4/1960 Glauberman .......... G06V 10/20
                                                        382/196
9,129,197 B1 * 9/2015 Madhani .......... G06K 19/06037
(Continued)

FOREIGN PATENT DOCUMENTS

CN      103824373      5/2014
CN      106326889      1/2017
(Continued)

OTHER PUBLICATIONS

"International Search Report (Form PCT/ISA/210) of PCT/CN2019/103849," dated Nov. 20, 2019, pp. 1-4.
(Continued)

*Primary Examiner* — Tsung Yin Tsai
(74) *Attorney, Agent, or Firm* — JCIP GLOBAL INC.

(57) ABSTRACT

The disclosure provides a bill identification method, device, electronic device and a computer-readable storage medium. The method includes: obtaining an image of a bill to be identified; using a pre-trained area identification model to identify a final payment area of the bill in the image; using a pre-trained character identification model to identify the final payment amount in the final payment area. By applying the solution provided by the present disclosure, it is possible to realize automatic identification of the payment amount on the bill, and the efficiency of bill processing is improved.

16 Claims, 8 Drawing Sheets

(51) Int. Cl.
*G06T 7/10* (2017.01)
*G06V 30/412* (2022.01)
*G06V 30/416* (2022.01)
*G06V 30/10* (2022.01)

(52) U.S. Cl.
CPC .......... *G06V 30/412* (2022.01); *G06V 30/416* (2022.01); *G06V 30/10* (2022.01)

(56) References Cited

U.S. PATENT DOCUMENTS

| | | | | |
|---|---|---|---|---|
| 9,436,937 | B1* | 9/2016 | Madhani | G06V 10/235 |
| 10,810,420 | B2* | 10/2020 | Bhatnagar | G06F 18/22 |
| 11,361,570 | B2* | 6/2022 | Xu | G06V 30/413 |
| 2007/0058856 | A1* | 3/2007 | Boregowda | G06V 30/244 |
| | | | | 382/105 |
| 2014/0064618 | A1* | 3/2014 | Janssen, Jr. | G06V 30/416 |
| | | | | 382/182 |
| 2014/0268250 | A1* | 9/2014 | Nepomniachtchi | G06V 10/22 |
| | | | | 358/462 |
| 2017/0178149 | A1 | 6/2017 | Morimura et al. | |
| 2017/0351913 | A1* | 12/2017 | Chen | G06V 30/412 |
| 2021/0216765 | A1* | 7/2021 | Xu | G06V 30/414 |
| 2022/0012488 | A1* | 1/2022 | Xu | G06V 20/62 |

FOREIGN PATENT DOCUMENTS

| | | |
|---|---|---|
| CN | 107977665 | 5/2018 |
| CN | 109872444 | 6/2019 |

OTHER PUBLICATIONS

"Office Action of China Counterpart Application", dated Nov. 1, 2019, p. 1-p. 6.

* cited by examiner

BILL IDENTIFICATION METHOD, DEVICE, ELECTRONIC DEVICE AND COMPUTER-READABLE STORAGE MEDIUM

BACKGROUND

Technical Field

The present disclosure relates to the field of artificial intelligence technology, and in particular related to a bill identification method, device, electronic device, and a computer-readable storage medium.

Description of Related Art

With the continuous development of economy and continuous improvement of people's consumption level, in order to protect people's consumption rights, invoices now stand for powerful protection for consumers and effective receipt for reimbursement. Therefore, financial staff need to deal with a large number of invoices every day, and how to automatically identify the payment amount on the invoices is very important to the finance staff.

SUMMARY

A purpose of the present disclosure is to provide a bill identification method, device, electronic device, and a computer-readable storage medium so as to realize automatic identification of the payment amount on invoices.

To achieve the above purpose, the present disclosure provides a bill identification method, which includes:
  Obtaining an image of the bill to be identified;
  Using a pre-trained area identification model to identify the final payment area of the bill in the image;
  Adopting a pre-trained character identification model to identify the final payment amount in the final payment area.
Optionally, the method further includes:
  After identifying the final payment area of the bill in the image, segmenting the final payment area;
  Outputting a segmented picture of the final payment area and the final payment amount for comparison and display.
Optionally, the step of outputting the segmented picture of the final payment area and the final payment amount for comparison and display includes:
  Outputting the segmented picture of the final payment area and the final payment amount, and displaying the segmented picture above the final payment amount.
Optionally, the step of outputting the segmented picture of the final payment area and the final payment amount for comparison and display includes:
  Outputting the segmented picture of the final payment area and the final payment amount, and displaying the segmented picture on the left side of the final payment amount.
Optionally, if the final payment area cannot be identified and/or the final payment amount in the final payment area cannot be identified, the method further includes:
  Adopting the area identification model to identify an expense summary area of the bill in the image;
  Adopting the character identification model to identify character content in the expense summary area;
  Calculating the final payment amount based on the character content of the expense summary area according to a preset rule base.
Optionally, the method further includes:
  Determining a sub-area to perform display in the expense summary area according to the character content in the expense summary area, and segmenting the sub-area;
  Outputting the final payment amount and the segmented picture of the sub-area for comparison and display.
Optionally, if the sub-area to perform display in the expense summary area cannot be determined, the method further includes:
  Segmenting the entire expense summary area;
  Outputting the final payment amount and the segmented picture of the expense summary area for comparison and display.
Optionally, the step of calculating the final payment amount based on the character content of the expense summary area according to the preset rule base includes:
  Determining an expense type included in the expense summary area and the corresponding amounts through the character content of the expense summary area;
  Determining the rule corresponding to the included expense type from the preset rule base, and using the determined rules and the amount corresponding to the expense type to calculate the final payment amount.
Optionally, the expense type includes one or more of original price, service fee, tip, discount, deduction, tax, currency, exchange rate, unit price and quantity, freight and fuel cost.

To achieve the above purpose, the present disclosure further provides a bill identification device, the device includes:
  An obtaining module, configured to obtain an image of a bill to be identified;
  A first identification module, configured to use a pre-trained area identification model to identify a final payment area of the bill in the image;
  A second identification module, configured to use a pre-trained character identification model to identify a final payment amount in the final payment area.
Optionally, the device further includes:
  A segmenting module, configured to segment the final payment area after identifying the final payment area of the bill in the image;
  A first display module, configured to output a segmented picture of the final payment area and the final payment amount for comparison and display.
Optionally, the step of outputting, by the first display module, the segmented picture of the final payment area and the final payment amount for comparison and display includes:
  Outputting the segmented picture of the final payment area and the final payment amount, and displaying the segmented picture above the final payment amount.
Optionally, the step of outputting, by the first display module, the segmented picture of the final payment area and the final payment amount for comparison and display includes:
  Outputting the segmented picture of the final payment area and the final payment amount, and displaying the segmented picture on the left side of the final payment amount.
Optionally, the device further includes a calculating module; wherein, if the final payment area cannot be identified and/or the final payment amount in the final payment area cannot be identified, The first identification module is further configured to use the area identification model to identity an expense summary area of the bill in the image;

The second identification module is further configured to use the character identification model to identify character content in the expense summary area;

The calculating module is configured to calculate the final payment amount based on the character content of the expense summary area according to a preset rule base.

Optionally, the device further includes:

A determining module, configured to determine a sub-area to perform display in the expense summary area according to the character content in the expense summary area, and segment the sub-area by using a segmenting module;

A second display module, further configured to output the final payment amount and the segmented picture of the sub-area for comparison and display.

Optionally, if the sub-area to perform display in the expense summary area cannot be determined, The determining module is further configured to perform segmenting processing on the entire expense summary area by using a segmenting module;

The second display module is further configured to output the final payment amount and a segmented picture of the expense summary area for comparison and display.

Optionally, the calculating module includes:

A determining sub-module, configured to determine the expense type included in the expense summary area and the corresponding amounts based on the character content of the expense summary area;

A calculating sub-module, configured to determine a rule corresponding to an included expense type from a preset rule base, and calculate the final payment amount by using the determined rule and an amount corresponding to the expense type.

Optionally, the expense type includes one or more of original price, service fee, tip, discount, deduction, tax, currency, exchange rate, unit price and quantity, freight and fuel cost.

To achieve the above purpose, the present disclosure further provides an electronic device including a processor, a communication interface, a memory, and a communication bus, wherein the processor, the communication interface, and the memory complete communication with each other through the communication bus;

A memory, configured to store computer programs;

A processor, configured to implement the steps of the bill identification method described in any of the above embodiments when executing a computer program stored in the memory.

To achieve the above purpose, the present disclosure also provides a computer-readable storage medium, characterized in that a computer program is stored in the computer-readable storage medium, and the steps of the bill identification method described in any of the above embodiments are implemented when the computer program is executed by the processor.

Compared with the related art, the present disclosure uses an area identification model to identify the image of the bill to be identified when performing bill identification, the final payment area is identified, and then a character identification model is used to identify the final payment amount in the final payment area, thereby realizing automatic identification and display of the payment amount on the invoice, thus improving the efficiency of bill processing.

DESCRIPTION OF THE EMBODIMENTS

In the following, a bill identification method, device, electronic device and a computer-readable storage medium provided by the present disclosure are described in detail with reference to the drawings and specific embodiments. The advantages and features of the disclosure will be more comprehensible based on the claims and the following description.

In order to solve the problems in the related art, embodiments of the present disclosure provide a bill identification method, device, electronic device, and a computer-readable storage medium.

It should be noted that the bill identification method in the embodiment of the present disclosure can be applied to the bill identification device in the embodiment of the present disclosure, and the bill identification device can be configured on an electronic device, wherein the electronic device may be a personal computer, a mobile terminal, or the like, and the mobile terminal may be a hardware device such as a mobile phone or a tablet computer with various operating systems.

Figure 1:
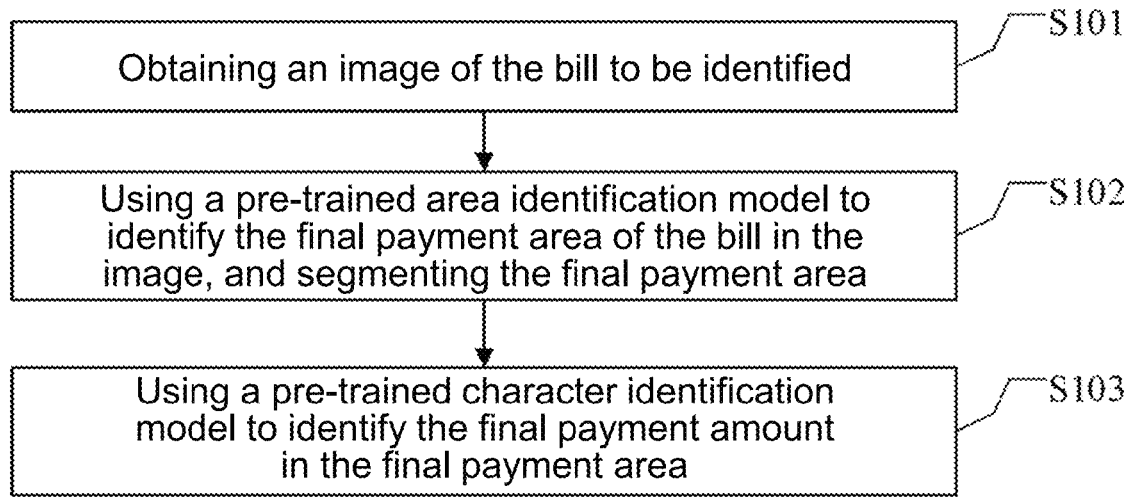
FIG. 1 is a schematic flowchart of a bill identification method according to an embodiment of the present disclosure.

FIG. 1 is a schematic flowchart of a bill identification method according to an embodiment of the present disclosure. Please refer to FIG. 1, a bill identification method may include the following steps:

Step S101, obtaining an image of a bill to be identified.

The bills described in the present disclosure can be invoices, checks, tax bills, receipts, shopping lists, receipts for food and beverage, insurance policies, reimbursement orders, courier orders, itineraries, tickets and other documents containing payment amounts.

Step S102, using a pre-trained area identification model to identify the final payment area of the bill in the image.

The final payment area of the bill can be understood as the area where the final payment amount of the bill is shown. For example, the final payment area in the value-added tax invoice is the "total price and tax" area; the final payment area of the train ticket is the display area of the fare; the final payment area of the fixed invoice is the area showing the invoice amount; and the area showing the payment method in the shopping receipt preferentially serves as the final payment area. Payment methods include, for example, Alipay, payment by credit card, payment by WeChat, online payment, UnionPay, etc. As the shopping receipt shown in FIG. 3C, the area where "Alipay: 27.10" is shown is the final payment area.

The bill image is input into the area identification model, and the area identification model can identify the final payment area in the bill, and can also mark the identified final payment area, and segment the final payment area, that is, to extract the final payment area (from the image of the bill), thereby obtaining a segmented picture of the final payment area.

Step S103, using a pre-trained character identification model to identify the final payment amount in the final payment area.

After the final payment area is identified, the bill image marked with the final payment area may be input into the character identification model, or the segmented picture of the final payment area may be directly input into the character identification model, and the final payment amount in the final payment area can be identified through the character identification model.

In actual applications, the segmented picture of the final payment area and the final payment amount can also be output for comparison and display. After identifying the final payment area and the final payment amount, the segmented picture of the final payment area and the final payment area are input and both of them are displayed for comparison, so that it is convenient for users to check and verify whether the identification result is correct.

Figure 2A:
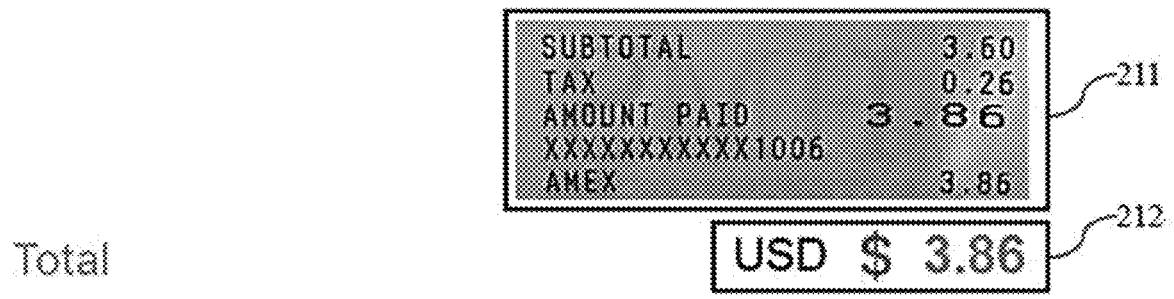
FIG. 2A to FIG. 2B are specific examples of output results after identification of a bill provided by an embodiment of the present disclosure.
Figure 2B:
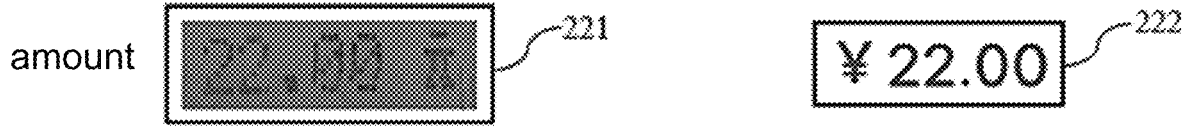

Specifically, the method of outputting the segmented picture of the final payment area and the final payment amount for comparison and display may be performed for vertical comparison or horizontal comparison, for example, by displaying the segmented picture above the final payment amount, or displaying the segmented picture on the left side of the final payment amount. FIG. 2A and FIG. 2B are schematic views of output results after identification of a bill. As shown in FIG. 2A, a segmented picture 211 is displayed above the final payment amount 212, and as shown in FIG. 2B, a segmented picture 221 is displayed on left side of the final payment amount 222.

Further, in actual application, if the final payment area cannot be identified in step S102, and/or, the final payment amount in the final payment area cannot be identified in step S103, for instance, the final payment area or the final payment amount is torn, stained or the print is vague and cannot be identified, the method of the present disclosure may further include: using the area identification model to identify an expense summary area of the bill in the image; using the character identification model to identify the character content in the expense summary area; and then calculating the final payment amount through the character content in the expense summary area according to the preset rule base.

Then, according to the character content in the expense summary area, a sub-area to perform display in the expense summary area may be determined, and the sub-area is segmented, that is, the sub-area is extracted (from the image of the bill); the final payment amount and segmented picture of the sub-area are output for comparison and display.

The expense summary area of the bill can be understood as: an area showing multiple expense types. For the expense summary area of different bills, please refer to the areas marked with rectangular box in the bills shown in FIG. 3B to FIG. 3H. Specifically, the type of expenses includes but is not limited to: original price, service charge, tip, discount, deduction, tax, currency, exchange rate, unit price and quantity, freight, fuel cost, etc.

Specifically, calculating the final payment amount based on the character content in the expense summary area according to the preset rule base may include: determining the expense type included in the expense summary area and the corresponding amount through the character content in the expense summary area; determining the rules corresponding to the included expense type from the preset rule base, and using the determined rules and the amount corresponding to the expense type to calculate the final payment amount. It can be understood that each rule in the rule base can be determined according to the relationship between various types of expenses and the final payment amount.

For example, if the type of expense included in the expense summary area is the original price of the product and discount, the rule for calculating the final payment amount should be the original price of the product minus the discount. Also, if the type of expense included in the expense summary area is the original price of the product, discount and shipping charge, the rule for calculating the final payment amount should be the original price of product multiplied by (1−discount) plus shipping charge.

After calculating the final payment amount, the sub-area to perform display in the expense summary area is determined. The sub-area to perform display can be understood as the area showing the amount that is the same as the calculated final payment amount in the expense summary area.

In actual application, if it is not possible to determine the sub-area that needs to perform display in the expense summary area, the method may further include: segmenting the entire expense summary area, that is, to extract the expense summary area (from the image of the bill); and outputting the final payment amount and the segmented picture of the expense summary area for comparison and display.

The following describes the method of the present disclosure with reference to specific examples of some bills.

Figure 3A:
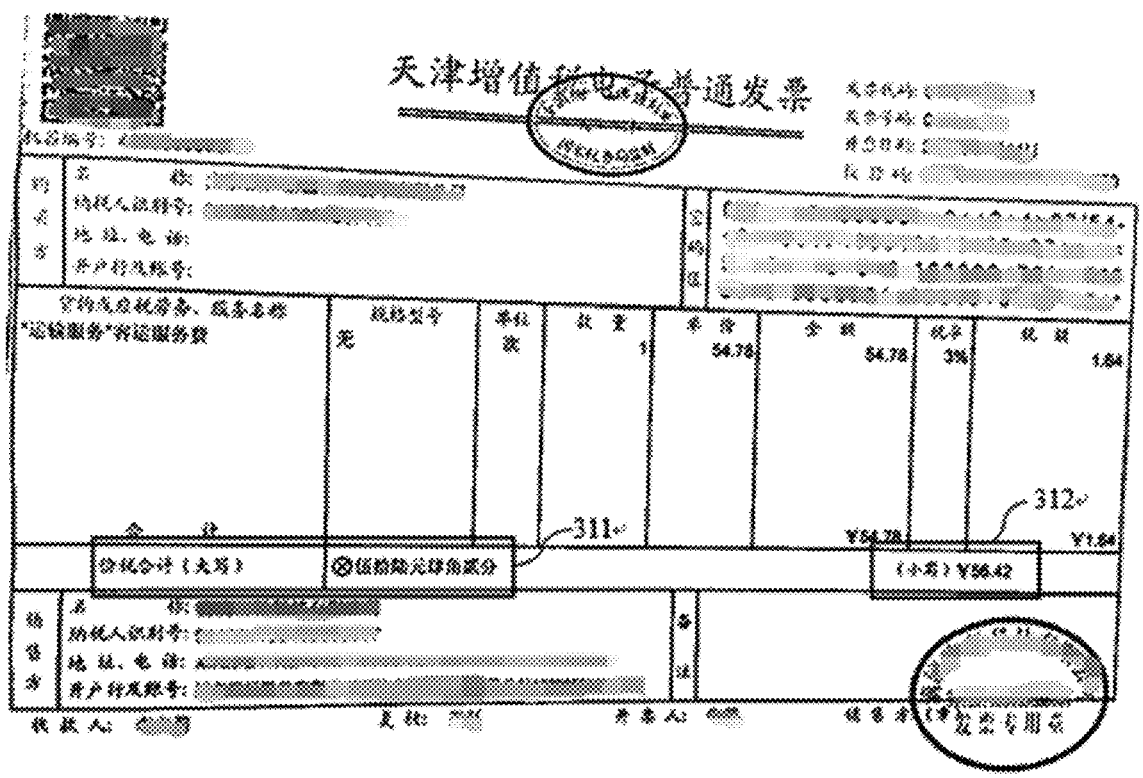
FIG. 3A to FIG. 3H are specific examples of invoices provided by an embodiment of the present disclosure.

As shown in FIG. 3A, the value-added tax invoice can be identified with a financial-character amount area 311 indicating "total price and tax" by the area identification model as the final payment amount and the segmented area. If the financial-character amount area 311 is not clearly displayed and cannot be identified, for example, the financial-character amount area 311 is partially torn, stained or the print is vague and cannot be identified, a normal-character amount area 312 may be selected as the segmented area.

Figure 3B:
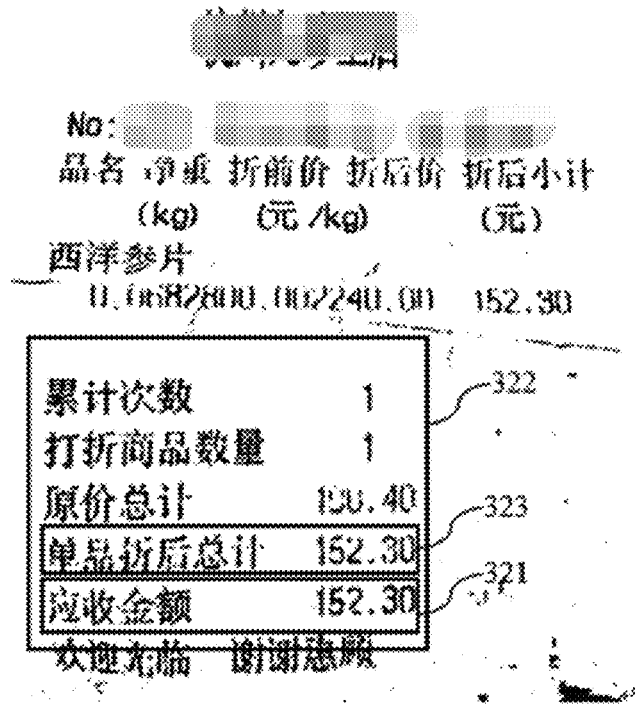

As shown in FIG. 3B, the shopping receipt is identified with a "receivable amount" area 321 as the final payment area by the area identification model and the area is segmented. If the area cannot be identified, for example, the area or the part showing the final payment amount 152.30 is torn, stained, or the print is vague and cannot be identified, then the expense summary area 322 is identified. According to the rules and analysis, the final payment amount should be the amount corresponding to "total amount after discount of unit price", and therefore "total amount after discount of unit price" and the area 323 corresponding to the amount thereof are segmented and displayed.

Figure 3C:
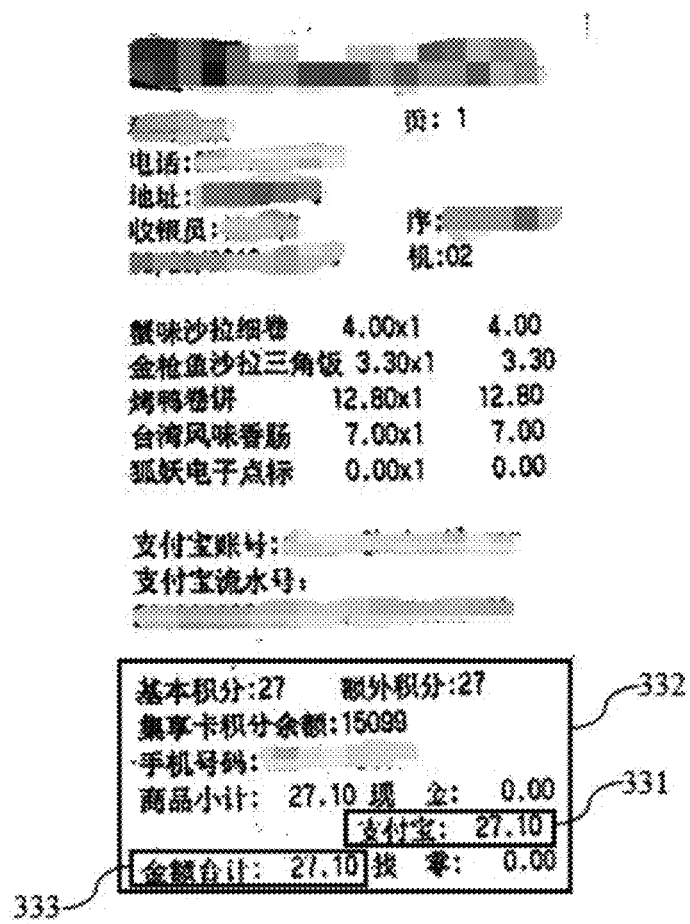

As shown in FIG. 3C, the shopping receipt shows that the payment was made by Alipay, and therefore the area identification model identifies that the area 331 showing "Alipay: 27.10" is the final payment area and the area is segmented. If the area cannot be identified, for example, the area or the part showing the final payment amount 27.10 is torn, stained or the print is vague and cannot be identified, then the expense summary area 332 is identified. According to the rules, it is determined that the total amount part 333 should be the final payment amount, and therefore the area is segmented and displayed.

Figure 3D:
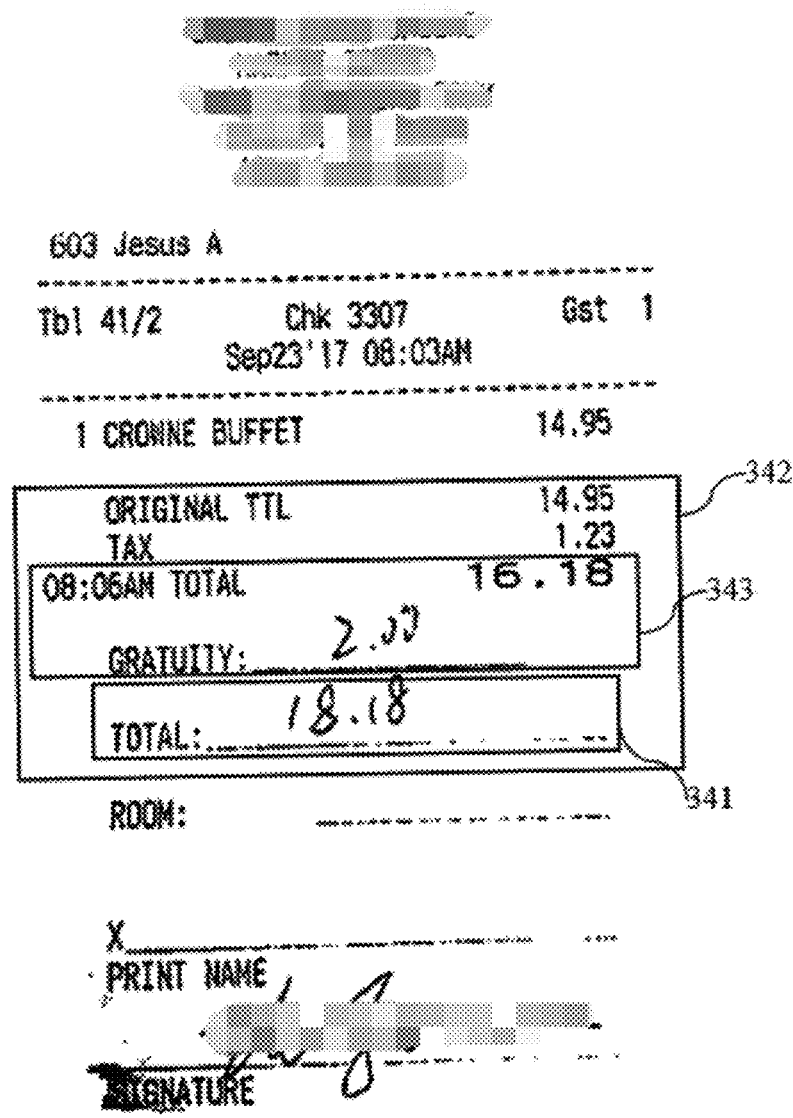

As shown in FIG. 3D, there are two total areas on the bill, which are "total16.18" and "total18.18" respectively.

According to the rules, the total area 341 at the lower part is preset as the final payment area, which is segmented and displayed. If the area cannot be identified, for example, the area or the part showing the final payment amount 18.18 is torn, stained, or the print is vague and cannot be identified, then the expense summary area 342 is identified, and it is identified that the total at the upper part is 16.18, gratuity is 2, thus calculating that the final payment amount is 18.18, and the sub-area 343 that needs to perform display in the expense summary area shown in the picture is segmented and displayed for comparison.

Figure 3E:

In the take-out bill shown in FIG. 3E, the take-out bill is a bit special. The receivable amount displayed on the bill is 0 because it has been paid online, and therefore the expense summary area 352 can be identified, and it is identified that the commodity amount is 42.1 and the discount amount is 22.0, thus calculating that the final payment amount should be 20.1, and the expense summary area 352 is segmented and displayed.

Figure 3F:
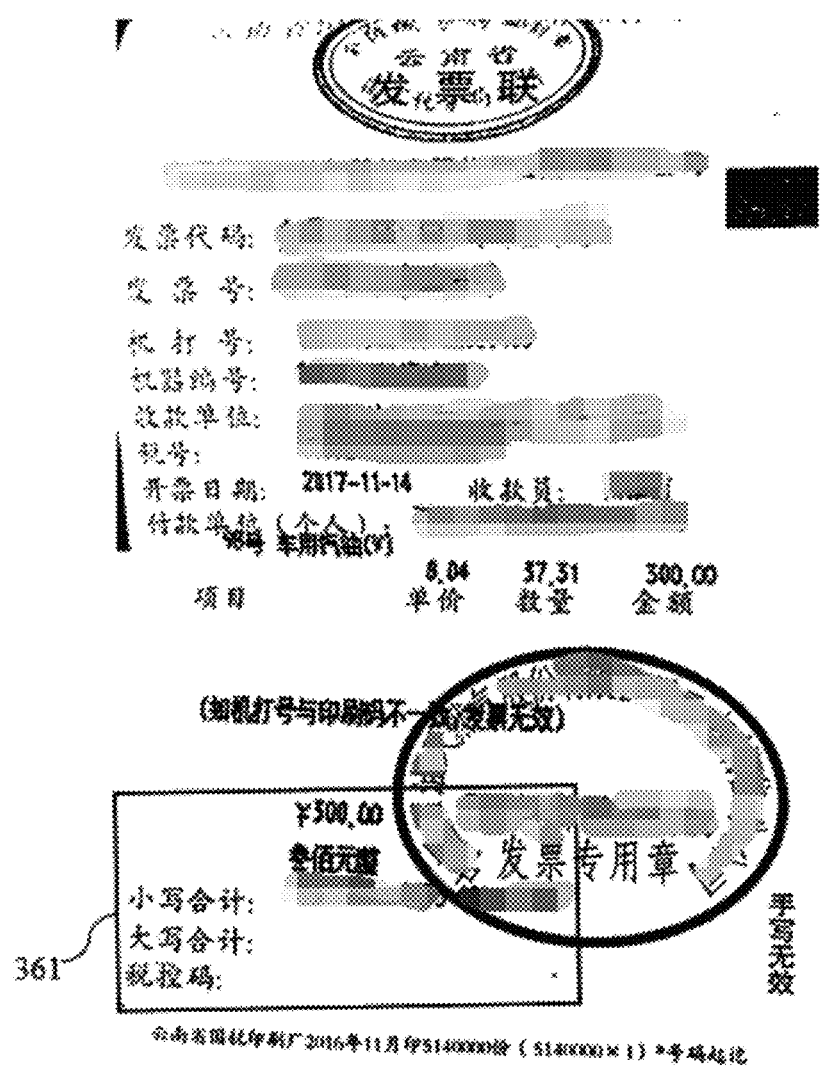

Regarding the bill shown in FIG. 3F, since the amount of money printed in area 361 in the picture is not aligned with the item on the left, the entire area 361 is considered as the final payment area and segmented and displayed for comparison.

Figure 3G:
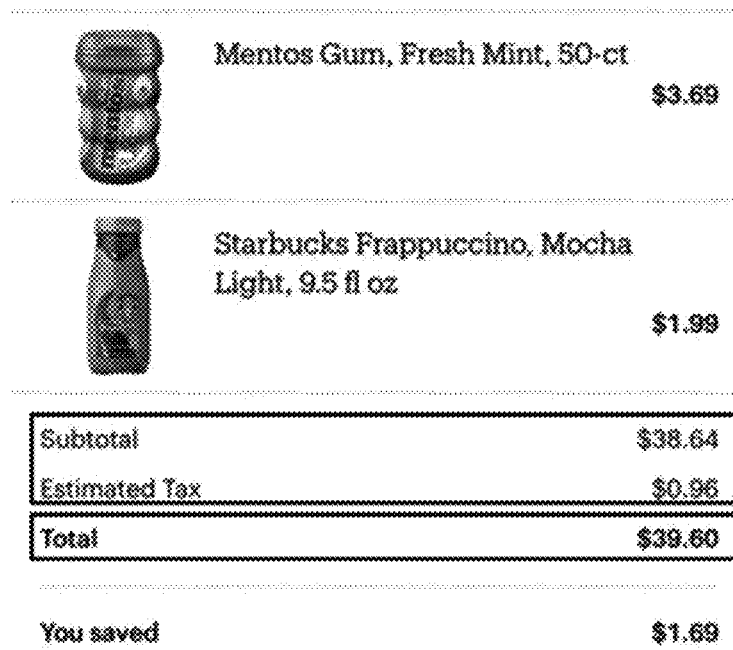

In the shopping receipt shown in FIG. 3G, the area 371 showing "total $39.60" is the final payment area. If the area cannot be identified, for example, the area or the part showing the final payment amount $39.60 is torn, stained, or the print is vague and cannot be identified, then the expense summary area 372 is identified, wherein subtotal is $38.64, estimated tax is $0.96, thus calculating that the final payment amount is $39.60, and then the expense summary area 372 is segmented and compared with the final payment amount and displayed.

Figure 3H:
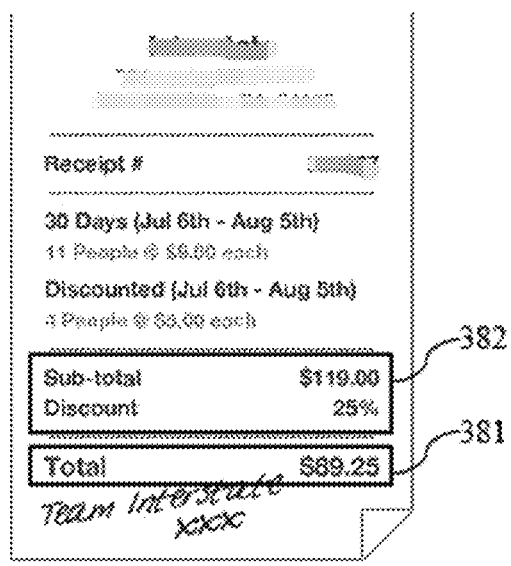

In the bill shown in FIG. 3H, the area 381 showing "total $89.25" is the final payment area. If the area cannot be identified, for example, the area or the part showing the final payment amount $89.25 is torn, stained or the print is vague and cannot be identified, then the expense summary area 382 is identified, wherein sub-total is $119.00, discount is 25%, and the final payment amount is calculated to be $89.25 according to the rules. Then the expense summary area 382 is segmented and compared with the final payment amount and displayed.

The following briefly introduces the training process of the area identification model and the character identification model.

The area identification model can be obtained through the following process: labeling each bill image sample in the bill image sample set to label the final payment area and/or expense summary area in each bill image sample; and training the neural network through the labeled bill image sample set to obtain the area identification model. When labeling the final payment area and/or expense summary area, it is also possible to label whether this area is the final payment area or the expense summary area.

The character identification model can be obtained through the following process: the final payment area and/or the expense summary area labeled during the training process of the area identification model are labeled to mark the characters in each area; the neural network is trained through each of the labeled areas to obtain the character identification model.

Certainly, the training set for the character identification model may also be different from the training set for the area identification model, which is not limited in the present disclosure.

In summary, compared with the related art, the present disclosure uses an area identification model to identify the image of the bill to be identified when identifying a bill, thereby identifying the final payment area, and then uses a character identification model to identify the final payment amount in the final payment area, thereby realizing the automatic identification and display of the payment amount on the bill, and thus improving the efficiency of bill processing.

Figure 4:
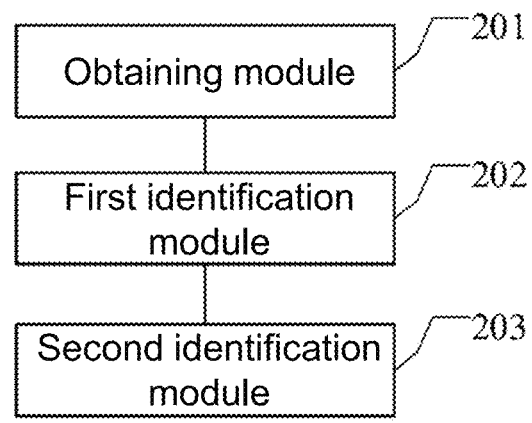
FIG. 4 is a schematic structural view of a bill identification device according to an embodiment of the present disclosure.

Corresponding to the above-mentioned embodiment of the bill identification method, the present disclosure provides a bill identification device. Referring to FIG. 4, the device may include:

An obtaining module 201, configured to obtain an image of a bill to be identified;

A first identification module 202, configured to use a pre-trained area identification model to identify a final payment area of the bill in the image;

A second identification module 203, configured to use a pre-trained character identification model to identify a final payment amount in the final payment area.

Optionally, the device may further include:

A segmenting module, configured to segment the final payment area after identifying the final payment area of the bill in the image;

A first display module, configured to output a segmented picture of the final payment area and the final payment amount for comparison and display.

Optionally, the first display module is specifically configured to:

Output a segmented picture of the final payment area and the final payment amount, and display the segmented picture above the final payment amount.

Optionally, the first display module is specifically configured to:

Output a segmented picture of the final payment area and the final payment amount, and display the segmented picture on the left side of the final payment amount.

Optionally, if the final payment area and/or the final payment amount in the final payment area cannot be identified, the device may further include a calculating module; wherein, The first identification module 202 is further configured to use the area identification model to identify an expense summary area of the bill in the image;

The second identification module 203 is further configured to use the character identification model to identify character content in the expense summary area;

The calculating module is configured to calculate the final payment amount based on the character content of the expense summary area according to a preset rule base.

Optionally, the device may further include:

A determining module, configured to determine a sub-area to perform display in the expense summary area according to the character content in the expense summary area, and segment the sub-area by using a segmenting module;

The second display module, further configured to output the final payment amount and the segmented picture of the sub-area for comparison and display.

Optionally, if the sub-area to perform display in the expense summary area cannot be determined, The determining module may further use a segmenting module for segmenting the entire expense summary area;

The second display module may be further configured to output the final payment amount and a segmented picture of the expense summary area for comparison and display.

Optionally, the calculating module may include:

A determining sub-module, configured to determine the type of expense included in the expense summary area and the corresponding amount based on the character content of the expense summary area;

A calculating sub-module, configured to determine a rule corresponding to an included expense type from a preset rule base, and calculate the final payment amount by using the determined rule and an amount corresponding to the expense type.

Optionally, the type of expense may include: original price, service fee, tip, discount, deduction, tax, currency, exchange rate, unit price and quantity, freight, fuel cost.

Figure 5:
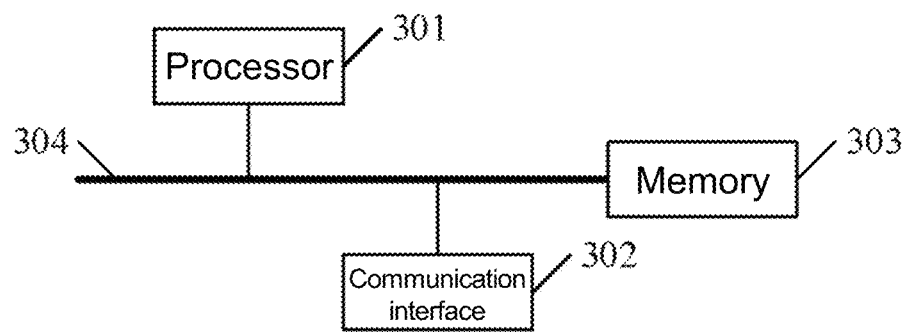
FIG. 5 is a schematic structural view of an electronic device according to an embodiment of the present disclosure.

The present disclosure also provides an electronic device, as shown in FIG. 5, including a processor 301, a communication interface 302, a memory 303, and a communication bus 304, wherein the processor 301, the communication interface 302, and the memory 303 complete communication with each other through the communication bus 304, A memory 303, configured to store a computer program;

The processor 301, configured to implement the following steps when executing a program stored in the memory 303:

Obtaining an image of the bill to be identified;

Using a pre-trained area identification model to identify the final payment area of the bill in the image;

Using a pre-trained character identification model to identify the final payment amount in the final payment area.

For the specific implementation of each step of the method and related explanations, please refer to the embodiment of the method shown in FIG. 1 described above, and no repetition will be incorporated herein.

In addition, other implementation methods of the bill identification method implemented by the processor 301 executing the program stored in the memory 303 are the same as the implementation methods mentioned in the foregoing embodiment of the method, and thus related details are not repeated here.

The communication bus of the electronic device mentioned above may be a bus conforming to Peripheral Component Interconnect (PCI) or a bus with Extended Industry Standard Architecture (EISA) and so on. The communication bus can be divided into address bus, data bus, control bus, etc. For ease of representation, the bus is only indicated by a thick line in the figure, but it does not mean that there is only one bus or one type of bus.

The communication interface is used for communication between the above electronic device and other devices.

The memory may include Random Access Memory (RAM), and may also include Non-Volatile Memory (NVM), such as at least one disk memory. Optionally, the memory may be at least one storage device located far from the above-mentioned processor.

The above processor may be a general-purpose processor, including a central processing unit (CPU), a network processor (NP), etc.; and may also be a digital signal processor (DSP), a dedicated application specific integrated circuit (ASIC), a field programmable gate array (FPGA), or other programmable logic devices, discrete gate or transistor logic devices, discrete hardware components.

The present disclosure also provides a computer-readable storage medium. A computer program is stored in the computer-readable storage medium, and the steps of the above-mentioned bill identification method are implemented when the computer program is executed by the processor.

It should be noted that each embodiment in this specification is described in a related manner, and the same and similar parts of various embodiments can be referred from each other. Each embodiment focuses on the differences from other embodiments. In particular, for the embodiments of the device, the electronic device, and the computer-readable storage medium, since they are basically similar to the embodiment of the method, the description of them is relatively simple. For the related parts, please refer to part of the embodiment of the method for details.

In this disclosure, relational terms such as first and second are used only to distinguish one entity or operation from another entity or operation, and do not necessarily require or imply the existence of any actual relationship or sequence between these entities or operations. Moreover, the terms "including", "comprising", or any other variation thereof are intended to encompass non-exclusive inclusion, such that a process, method, object, or device that includes a series of elements includes not only those elements but also those that are not explicitly listed, or further includes elements inherent to such process, method, object, or device. With no further limitations, the elements defined by the sentence "comprising a . . . " do not exclude the existence of other identical elements in the process, method, object or device including the elements.

The above description is only a description of the preferred embodiment of the present disclosure, and does not limit the scope of the present disclosure. Any changes and modifications made by those skilled in the art in accordance with the above disclosure shall fall within the scope of the claims.

What is claimed is:

1. A bill identification method, the method comprises:
obtaining an image of a bill to be identified;
using a pre-trained area identification model to identify a final payment area of the bill in the image;
using a pre-trained character identification model to identify a final payment amount in the final payment area;
after identifying the final payment area of the bill in the image, segmenting the final Payment area;
outputting a segmented picture of the final payment area and the final payment amount for comparison, and displaying the segmented picture on one side of the final payment amount;
if the final payment area cannot be identified and/or the final payment amount in the final payment area cannot be identified, wherein the method further comprises:
using the pre-trained area identification model to identify an expense summary area of the bill in the image;
using the pre-trained character identification model to identify character content in the expense summary area;
calculating the final payment amount based on the character content of the expense summary area according to a preset rule base.

2. The bill identification method according to claim 1, wherein the step of displaying the segmented picture on the one side of the final payment amount comprises:
displaying the segmented picture above the final payment amount.

3. The bill identification method according to claim 1, wherein the step of displaying the segmented picture on the one side of the final payment amount comprises:
displaying the segmented picture on the left side of the final payment amount.

4. The bill identification method according to claim 1, wherein the method further comprises:
  determining a sub-area to perform display in the expense summary area according to the character content in the expense summary area, and segmenting the sub-area;
  outputting the final payment amount and the segmented picture of the sub-area for comparison and display.

5. The bill identification method according to claim 4, wherein if the sub-area to perform display in the expense summary area cannot be determined, the method further comprises:
  segmenting the entire expense summary area;
  outputting the final payment amount and the segmented picture of the expense summary area for comparison and display.

6. The bill identification method according to claim 1, wherein the step of calculating the final payment amount based on the character content of the expense summary area according to the preset rule base comprises:
  determining an expense type included in the expense summary area and a corresponding amount through the character content of the expense summary area;
  determining a rule corresponding to the included expense type from the preset rule base, and using the determined rule and the amount corresponding to the expense type to calculate the final payment amount.

7. The bill identification method according to claim 6, wherein the expense type comprises one or more of original price, service fee, tip, discount, deduction, tax, currency, exchange rate, unit price and quantity, freight and fuel cost.

8. A bill identification device, the device comprises:
  an obtaining module, configured to obtain an image of a bill to be identified;
  a first identification module, coupled to the obtaining module and configured to use a pre-trained area identification model to identify a final payment area of the bill in the image;
  a second identification module, coupled to the first identification module and configured to use a pre-trained character identification model to identify a final payment amount in the final payment area;
  a segmenting module, coupled to the first identification module and configured to segment the final payment area after identifying the final payment area of the bill in the image;
  a first display module, coupled to the segmenting module and the second identification module, and configured to output a segmented picture of the final payment area and the final payment amount, and displaying the segmented picture on one side of the final payment amount; and
  a calculating module, coupled to the first identification module and the second identification module; wherein, if the final payment area cannot be identified and/or the final payment amount in the final payment area cannot be identified,
  the first identification module is further configured to use the pre-trained area identification model to identity an expense summary area of the bill in the image,
  the second identification module is further configured to use the pre-trained character identification model to identify character content in the expense summary area,
  the calculating module is configured to calculate the final payment amount based on the character content of the expense summary area according to a preset rule base.

9. The bill identification device according to claim 8, wherein the step of displaying the segmented picture on the one side of the final payment amount comprises:
  displaying the segmented picture above the final payment amount.

10. The bill identification device according to claim 8, wherein the step of displaying the segmented picture on the one side of the final payment amount comprises:
  displaying the segmented picture on the left side of the final payment amount.

11. The bill identification device according to claim 8, wherein the device further comprises:
  a determining module, coupled to the second identification module and configured to determine a sub-area to perform display in the expense summary area according to the character content in the expense summary area, and segment the sub-area by using a segmenting module;
  a second display module, coupled to the determining module and the second identification module, and configured to output the final payment amount and a segmented picture of the sub-area for comparison and display.

12. The bill identification device according to claim 11, wherein if the sub-area to perform display in the expense summary area cannot be determined,
  the determining module is further configured to perform segmenting processing on the entire expense summary area by using a segmenting module;
  the second display module is further configured to output the final payment amount and a segmented picture of the expense summary area for comparison and display.

13. The bill identification device according to claim 8, wherein the calculating module comprises:
  a determining sub-module, coupled to the second identification module and configured to determine an expense type included in the expense summary area and a corresponding amount through the character content of the expense summary area;
  a calculating sub-module, coupled to the determining sub-module and configured to determine a rule corresponding to an included expense type from the preset rule base, and calculate the final payment amount by using the determined rule and the amount corresponding to the expense type.

14. The bill identification device according to claim 13, wherein the expense type comprises one or more of original price, service fee, tip, discount, deduction, tax, currency, exchange rate, unit price and quantity, freight and fuel cost.

15. An electronic device, comprising a processor, a communication interface, a memory, and a communication bus, wherein the processor, the communication interface, and the memory complete communication with each other through the communication bus;
  the memory is configured to store a computer program;
  the processor is coupled to the memory and configured to implement the following steps when executing the computer program stored in the memory:
  obtaining an image of a bill to be identified;
  using a pre-trained area identification model to identify a final payment area of the bill in the image;
  using a pre-trained character identification model to identify a final payment amount in the final payment area;
  after identifying the final payment area of the bill in the image, segmenting the final Payment area;

outputting a segmented picture of the final payment area and the final payment amount, and displaying the segmented picture on one side of the final payment amount;

if the final payment area cannot be identified and/or the final payment amount in the final payment area cannot be identified, wherein the method further comprises:

using the pre-trained area identification model to identify an expense summary area of the bill in the image;

using the pre-trained character identification model to identify character content in the expense summary area;

calculating the final payment amount based on the character content of the expense summary area according to a preset rule base.

16. A non-transitory computer-readable storage medium, a computer program is stored in the computer-readable storage medium, and when the computer program is executed by a processor, steps of the bill identification method claimed in claim 1 are executed.

* * * * *